(12) United States Patent
Rijhsinghani (10) Patent No.: US 6,469,987 B1
(45) Date of Patent: *Oct. 22, 2002

(54) VIRTUAL LOCAL AREA NETWORK WITH TRUNK STATIONS

(75) Inventor: Anil G. Rijhsinghani, Marlborough, MA (US)

(73) Assignee: Enterasys Networks, Inc., Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/006,242

(22) Filed: Jan. 13, 1998

(51) Int. Cl.⁷ .......................... H04L 12/28; H04L 12/56
(52) U.S. Cl. ...................... 370/254; 370/390; 370/392; 370/401
(58) Field of Search ................................ 370/389, 390, 370/391, 392, 393, 401, 402, 400, 432, 445, 395, 254, 255, 256, 257, 258; 709/220, 221, 223, 245, 249

(56) References Cited

U.S. PATENT DOCUMENTS

| | | | |
|---|---|---|---|
| 4,823,338 A | 4/1989 | Chan et al. | 370/402 |
| 4,845,710 A | 7/1989 | Nakamura et al. | 370/366 |
| 4,933,937 A | 6/1990 | Konishi | 370/404 |
| 4,975,906 A | 12/1990 | Takiyasu et al. | |
| 5,018,133 A | 5/1991 | Tsukakoshi et al. | 340/2.4 |
| 5,138,615 A | 8/1992 | Lamport et al. | 370/400 |
| 5,218,603 A | 6/1993 | Watanabe | |
| 5,237,661 A | 8/1993 | Kawamura et al. | 707/1 |
| 5,321,693 A | 6/1994 | Perlman | 370/403 |
| 5,394,402 A | 2/1995 | Ross | 370/94.1 |
| 5,473,599 A | 12/1995 | Takatori et al. | 370/399 |
| 5,473,608 A | 12/1995 | Gagne et al. | |
| 5,500,860 A | 3/1996 | Perlman et al. | 370/85.13 |
| 5,594,732 A | 1/1997 | Bell et al. | 370/401 |
| 5,617,421 A | 4/1997 | Chin et al. | 370/402 |
| 5,619,495 A | 4/1997 | Yamanaka et al. | |

(List continued on next page.)

FOREIGN PATENT DOCUMENTS

| | | |
|---|---|---|
| EP | 0 860 958 A | 8/1998 |
| WO | WO 00/37064 A1 | 7/1999 |

OTHER PUBLICATIONS

International Search Report—PCT/US99/30712.
Anderson J.K., "Virtual LANS Take Network To Next Level," Computer Technology Review, U.S. Westworld Production Co., Los Angeles, vol. 16, No. 9, Sep. 1, 1996.

(List continued on next page.)

Primary Examiner—Chau Nguyen
Assistant Examiner—Soon-Dong Hyun
(74) Attorney, Agent, or Firm—Wolf, Greenfield & Sacks, P.C.

(57) ABSTRACT

A switch for use in a virtual area network communications system having multiple local area networks interconnected by multiple switches which are connected by a trunk having one or more trunk stations connected directly thereto, includes a first communications port, i.e., an access port, which connects to a first local area network. The first local area network is configured within a virtual area network which also includes a second local area network and a trunk station. The switch also includes a second communications port, i.e. a trunk port, connected to the trunk to which the trunk station is connected by another trunk port. A switch control console detects a multicast communication from the first local area network, duplicates the multicast communication to form a first communication and a second communication, appends a VLAN header to the first communication to form a VLAN communication, and directs transmission of the VLAN communication and the second communication to the second communication port, thereby facilitating delivery of the multicast communication to both the second local area network and the trunk station.

26 Claims, 8 Drawing Sheets

U.S. PATENT DOCUMENTS

| | | | |
|---|---|---|---|
| 5,621,734 A | 4/1997 | Mann et al. ................. | 709/227 |
| 5,636,215 A | 6/1997 | Kubo et al. .................. | 370/397 |
| 5,734,824 A | 3/1998 | Choi ..................... | 395/200.11 |
| 5,734,865 A | 3/1998 | Yu .............................. | 370/254 |
| 5,751,967 A | 5/1998 | Raab et al. | |
| 5,752,003 A | 5/1998 | Hart | |
| 5,768,257 A | 6/1998 | Khacherian et al. ........ | 370/229 |
| 5,796,740 A | 8/1998 | Perlman et al. ............. | 370/401 |
| 5,802,056 A | 9/1998 | Ferguson et al. ........... | 370/401 |
| 5,805,816 A | 9/1998 | Pacazo, Jr. et al. ......... | 370/230 |
| 5,838,677 A | 11/1998 | Kozaki et al. | |
| 5,878,232 A | 3/1999 | Marimuthu | |
| 5,889,762 A | 3/1999 | Pajuvirta et al. ............ | 370/230 |
| 5,892,922 A | 4/1999 | Lorenz ....................... | 709/238 |
| 5,949,783 A | 9/1999 | Husak et al. | |
| 5,959,989 A | 9/1999 | Gleeson et al. | |
| 5,959,990 A * | 9/1999 | Frantz et al. ................ | 370/392 |
| 5,963,556 A | 10/1999 | Varghese et al. | |
| 5,987,522 A | 11/1999 | Rijhsinghani | |
| 6,014,380 A | 1/2000 | Hendel et al. | |
| 6,023,563 A * | 2/2000 | Shani ......................... | 370/401 |
| 6,047,325 A | 4/2000 | Jain et al. | |
| 6,085,238 A | 7/2000 | Yuasa et al. | |
| 6,111,876 A * | 8/2000 | Frantz et al. ................ | 370/392 |
| 6,112,251 A * | 8/2000 | Rijhsinghani .............. | 709/249 |
| 6,128,665 A * | 10/2000 | Ityrralde ..................... | 709/238 |
| 6,157,647 A | 12/2000 | Husak | |
| 6,188,691 B1 | 2/2001 | Barkai et al. | |
| 6,301,224 B1 | 10/2001 | Rijhsinghani | |

OTHER PUBLICATIONS

"Draft Standard P802, 1O/D7" IEEE Standards For Local and Metropolitan Area Networks: Virtual Bridged Local Area Networks, Oct. 3, 1997, XP002103631 Retrieved from Internet: <URL : ftp://p8021:–go_wildcats@8021.hep.net/802 1/q–drafts/d7> see p. 183—p. 186.

Liu N. H. et al."A New Packet Scheduling Algorithm For Input–Buffered Multicast Packet Switches" IEEE Global Telecommunications Conference, Phoenix, Arizona, Nov. 3–8, 1997, vol. 3, Nov. 3, 1997, pp. 1695–1699, XP000737812 Institute of Electrical and Electronics Engineers, see paragraph 1.

Mark B. L. et al.:"Large Capacity Multiclass ATM Core Switch Architecture" ISS '97, World Telecommunications Congress. (International Switching Symposium), Global Network Evolution: Convergence or Collision? Toronto, Sep. 21–26, 1997 vol. 1, Sep. 21, 1997, pp. 417–423 XP0000720547.

Chang C–Y et al.:"A Broadband Packet Switch Architecture with Input and Output Queueing" Proceedings of the Global Telecommunications Conference (Globecom), San Francisco, Nov. 28–Dec. 2, 1994, vol. 1, Nov. 28, 1994, pp. 448–452, XP000488590 Institute of Electrical and Electronics Engineers.

Prabhakar B. et al.:"Multicast Scheduling for Input–Queued Switches" IEEE Journal on Selected Areas in Communications, vol. 15,No. 5, Jun. 1, 1997, pp. 855–866, XP000657038 see paragraph 1.

* cited by examiner

VIRTUAL LOCAL AREA NETWORK WITH TRUNK STATIONS

FIELD OF THE INVENTION

The present invention relates generally to communications networks and more particularly to virtual local area networks with trunk stations.

BACKGROUND OF THE INVENTION

Local area networks (LAN's) are used to facilitate communications between a number of users. Individual LAN's may be bridged together to allow a large number of users to communicate amongst themselves. These bridged LAN's may be further interconnected with other bridged LAN's using routers to form even larger communications networks.

Figure 1:
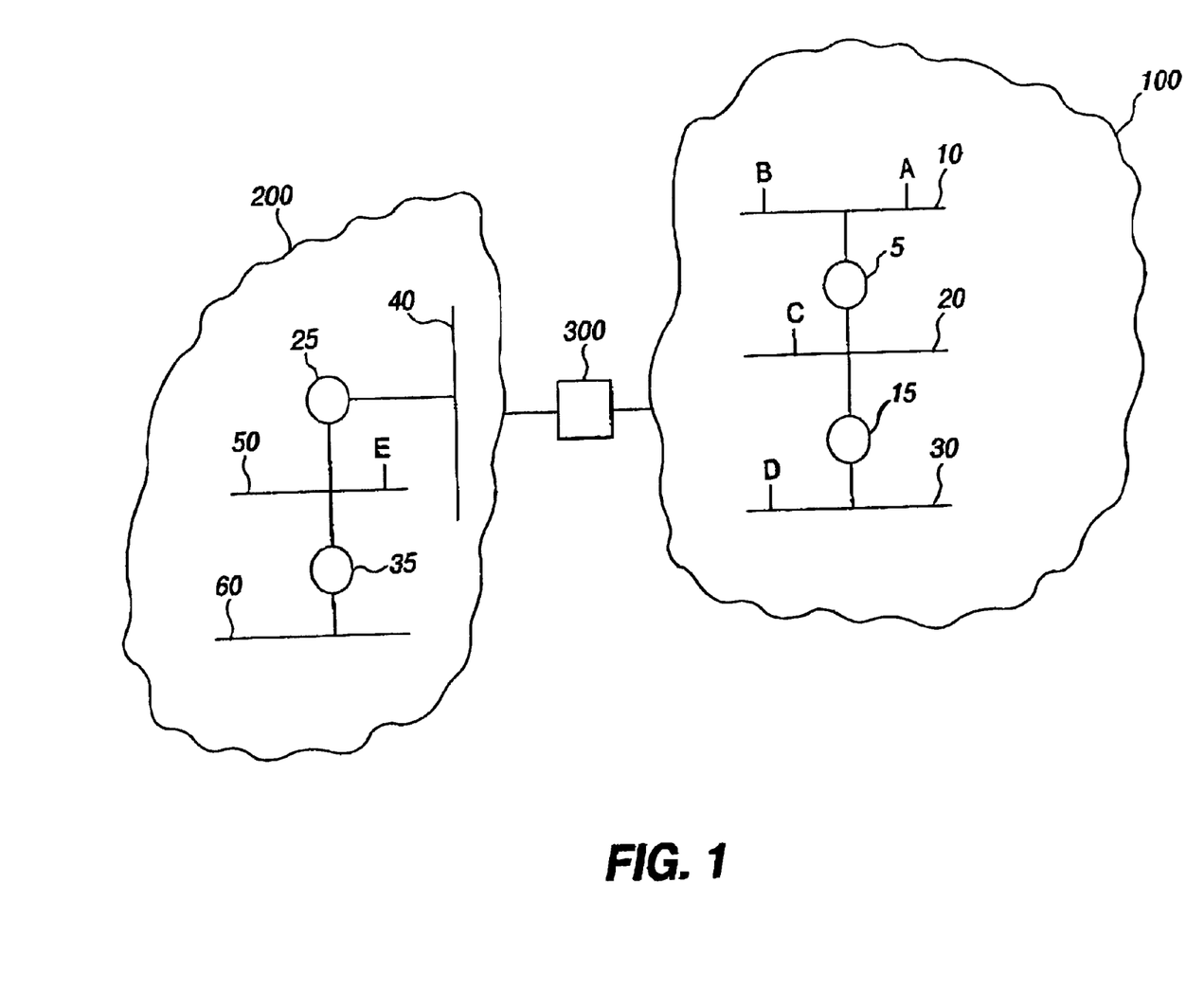
FIG. 1 depicts a prior art LAN configuration.

Prior art FIG. 1 depicts an exemplary interconnected bridged LAN system. The numerals 10, 20, 30, etc., are used to identify individual LAN's. Bridges between LAN's are designated by the numerals 5, 15, 25 and 35. A router between bridged LAN 100 and bridged LAN 200 is identified with the reference numeral 300. In the prior art bridged LAN system depicted, a user A is able to communicate with a user B without leaving the LAN 10. If user A desires to communicate with user C in LAN 20 or user D in LAN 30, the communication is transmitted via bridges 5 and/or 15.

If user A desires to communicate with user E, the communication must be routed via router 300 to bridged LAN 200. As will be understood by those skilled in the art, bridges operated at layer 2 of the network model and transparently bridge two LAN's. It is transparent to users A and C that communications between them are ported over bridge 5 because layer 2 bridges do not modify packets, except as necessary to comply with the type of destination LAN. However, if user A wishes to communicate with user E, the communication must be ported via router 300 which operates at level 3 of the network model. Accordingly, communications over routers flow at a much slower rate than communications over a bridge, and are regulated by the routers.

Therefore, LAN network administrators generally attempt to connect together those users who frequently communicate with each other in bridged LAN's. However, if the bridged LAN becomes too large, it becomes unscalable and may experience various well-known problems. Accordingly, routers are used to interconnect bridged LAN's so that the bridged LAN's themselves can be kept to an acceptable size. This results in delays in communications between users which are transmitted via the router 300. If, for example, in FIG. 1, user E and user A need to communicate frequently, it would be advantageous to interconnect LAN 10 and LAN 50 via a bridge rather than the router 300. This would require system rewiring, which is costly and may be impracticable under many circumstances, such as, if users A and E will only need to frequently communicate for a limited period of time.

Virtual LAN's (VLAN's) have recently been developed to address the deficiencies, in interconnected bridged LAN systems of the type depicted in FIG. 1. VLAN's allow LAN's to be bridged in virtually any desired manner independent of physical topography with switches operating at layer 2. Hence, the switches are transparent to the user. Furthermore, the bridging of LAN's can be changed as desired without the need to rewire the network. Because members of one VLAN cannot be tranmitted to the members of another VLAN, a fire wall is established to provide security which would not be obtainable in a hardwired interconnected bridged LAN system. Accordingly, VLAN systems provide many advantages over interconnected bridged LAN's.

Figure 2:
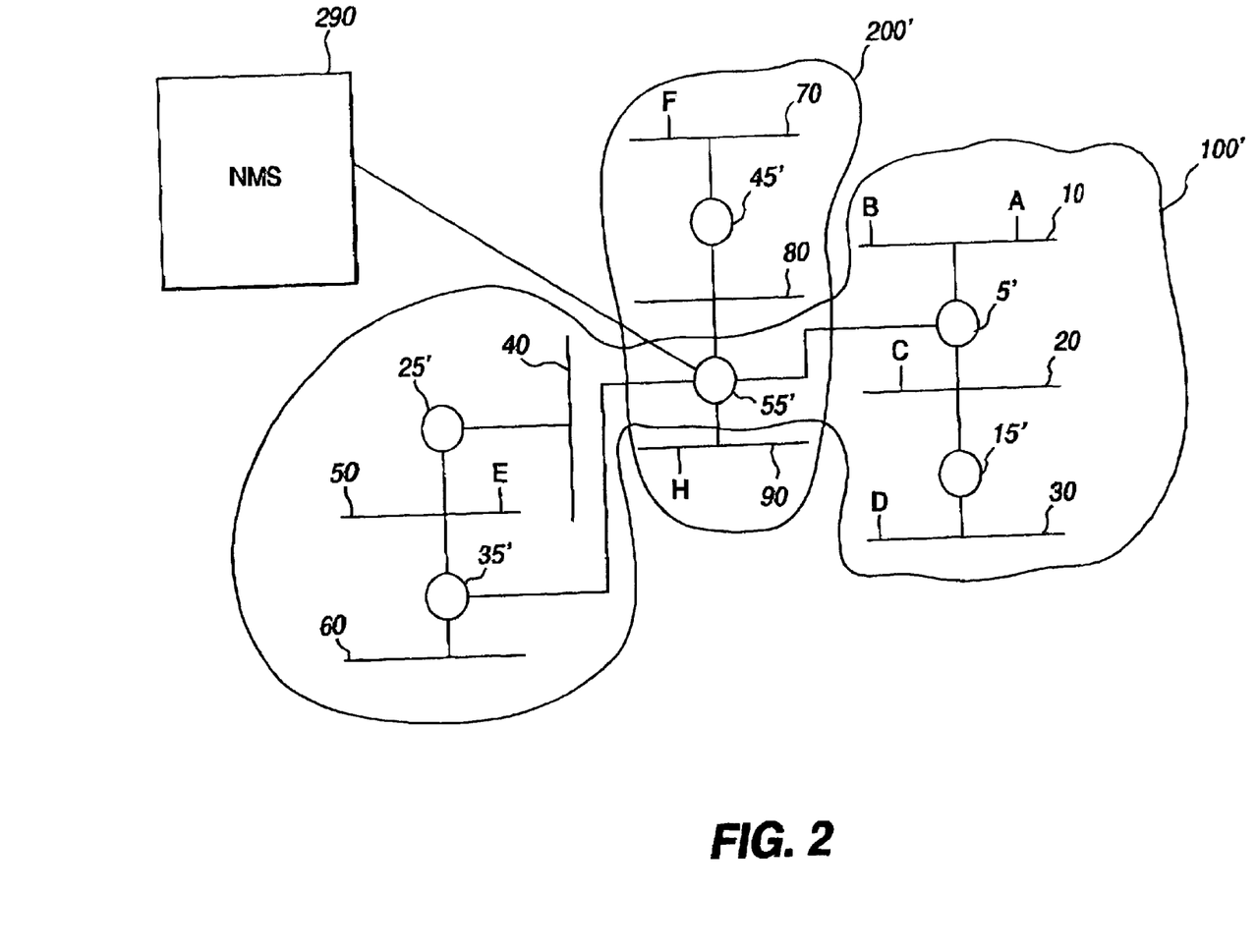
FIG. 2 depicts a prior art VLAN configuration.

For example, as shown in prior art FIG. 2, individual LAN's 10–90 are interconnected by layer 2 switches 5'–55'. A network management station (NMS) 290 controls the interconnection of the individual LAN's such that LAN's can be easily bridged to other LAN's on a long term or short term basis without the need to rewire the network. As depicted in FIG. 2, the NMS 290 has configured two VLAN's by instructing, e.g., programming, and thereby configuring the switches 5'–55' such that LAN's 10–60 are bridged together by switches 5'–45' and 55' to form VLAN 100' and LAN's 70–90 are bridged together by switches 45' and 55' to form VLAN 200'. This is possible because, unlike the bridges 5–35 of FIG. 1 which include only two ports, and accordingly are able to only transfer information from one LAN to another LAN, the switches 5'–55' are multiported and programmable by the NMS 290 such that the network can be configured and reconfigured in any desired manner by simply changing the switch instructions.

As shown in FIG. 2, the switch 55' has been instructed to transmit communications from user A of LAN 10 to user E of LAN 50, since both users are configured within VLAN 100'. User A, however, is not allowed to communicate with users H or F since these users are not configured within the VLAN 100' user group. This does not, however, prohibit users F and H, both of whom are members of VLAN 200', from communicating via switches 45' and 55'.

If it becomes desirable to change the network configuration, this is easily accomplished by issuing commands from NMS 290 to the applicable switches 5'–55'. For example, if desired, user H could be easily added to VLAN 100' by simply reconfiguring VLAN 100' at the NMS 290 to cause an instruction to be issued to switch 55' to allow communications to flow between users A–D and E and user H via switch 55', i.e., to include LAN 90 in VLAN 100' and remove it from VLAN 200'.

Because the switches 5'–55' are layer 2 switches, the bridge formed by the switch is transparent to the users within the VLAN. Hence, the transmission delays normally associated with routers, such as the router 300 of FIG. 1, are avoided. The power of the VLAN lies in its ability to dynamically control the network configuration through software on the NMS 290. More particularly, in accordance with its programmed instructions, the NMS 290 generates and transmits signals to instruct the switches 5'–55' to form the desired VLAN configurations.

Figure 3:
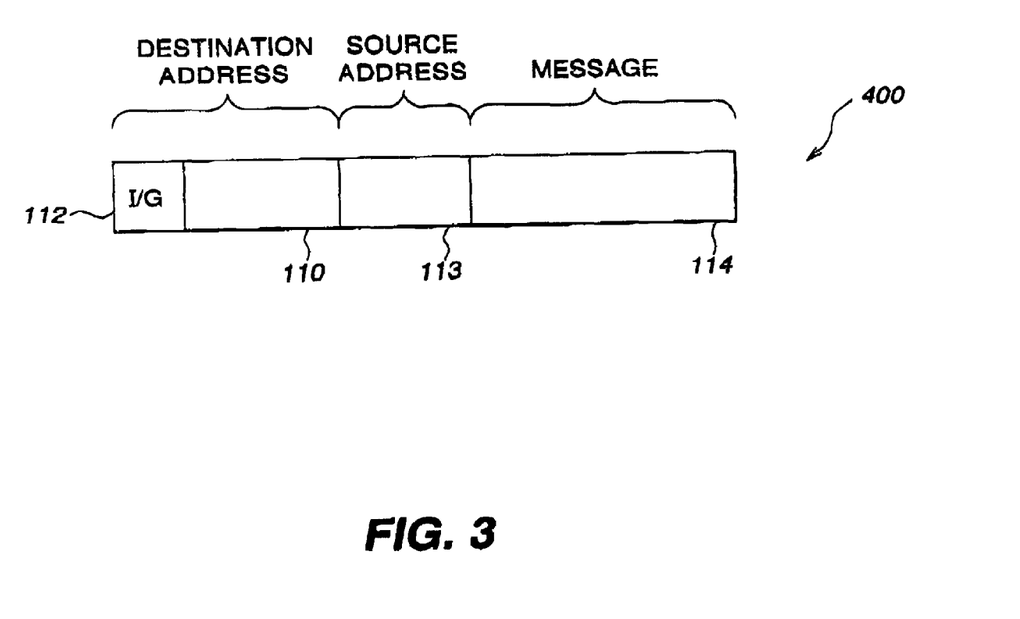
FIG. 3 depicts a conventional LAN message packet.

Multicasting refers to the ability of a station on the network to simultaneously communicate a single message to a number of other stations on the network. In a typical LAN protocol, as shown in FIG. 3, the communication packet 400 includes a destination address 110 having six bytes, a source address 113, and a message portion 114. The message portion 114 typically includes the applicable LAN protocol. If the I/G (Individual/Group) bit 112 is set to zero, the packet is directed to a single specified address. However, if the I/G bit is set to one, the packet is identified as a multicast packet and is transmitted to all LAN's of the bridged LAN.

For example, referring to FIG. 1, if member A of bridged LAN 100 wishes to multicast to members B and C of bridged LAN 100, the I/G bit of the destination address of the message packet would be set to one. If the I/G bit of the destination address, i.e., the multicast address designator, is at one, the bridges 5 and 15 understand that the communication is a multicast communication and direct the communication to all LAN's within the bridged LAN 100 for delivery to the members of the multicast group represented by the multicast address contained in the first 5 bytes of the MAP address. It will be noted that multicast communications are not routed by routers such as router 300 of FIG. 1. Accordingly, in a conventional interconnected bridged LAN system, multicast communications cannot be distributed between bridged LAN's. Further, because multicast communications within a bridged LAN are distributed to all individual LAN's, e.g. 10–30 in FIG. 1, whether or not any member of a particular LAN within the bridged LAN is a member of the multicast group to whom the sender has addressed the message, network bandwidth may be unnecessarily utilized to communicate the message to the desired recipients.

In a VLAN network, the aforementioned problems are avoided. First, because all switching is done at level 2, i.e., no level 3 routers exist in the system, multicast communications may be transmitted to network members on any LAN within the VLAN. Further, using the NMS 290, a VLAN can be configured to include only those individual LAN's which include members to whom it is desired to transmit the multicast. Accordingly, network bandwidth is not unnecessarily used to transmit multicast messages to individual LAN's which lack members of the multicast group to whom the multicast communication is addressed. As will be recognized by those skilled in the art, as multicasting continues to grow in popularity, the amount of wasted bandwidth utilization in conventional LAN networks has increased. Hence, multicasting in a VLAN system requires less bandwidth utilization, i.e. multicast communications can be transmitted only to LAN's associated with members of the multicast member group, while providing broader user coverage, i.e. multicast communications can be transmitted to any user within a VLAN, as compared to an interconnected bridged LAN system. Hence, VLAN's offer a significant advantage over standard LAN architectures in this regard.

Further still, because VLAN's can be rearranged or reconfigured dynamically, the members within a multicast group can be increased or decreased simply by modifying the multicast member group using the NMS 290 of FIG. 2. If multicasting becomes excessive over VLAN 100', the NMS 290 can easily modify the multicast member group to exclude one or more LAN's to reduce the multicasting overhead on the VLAN. VLAN 100' can also be easily reconfigured to, for example, include LAN 60, thereby extending the multicast communications capabilities of the VLAN.

Figure 4:
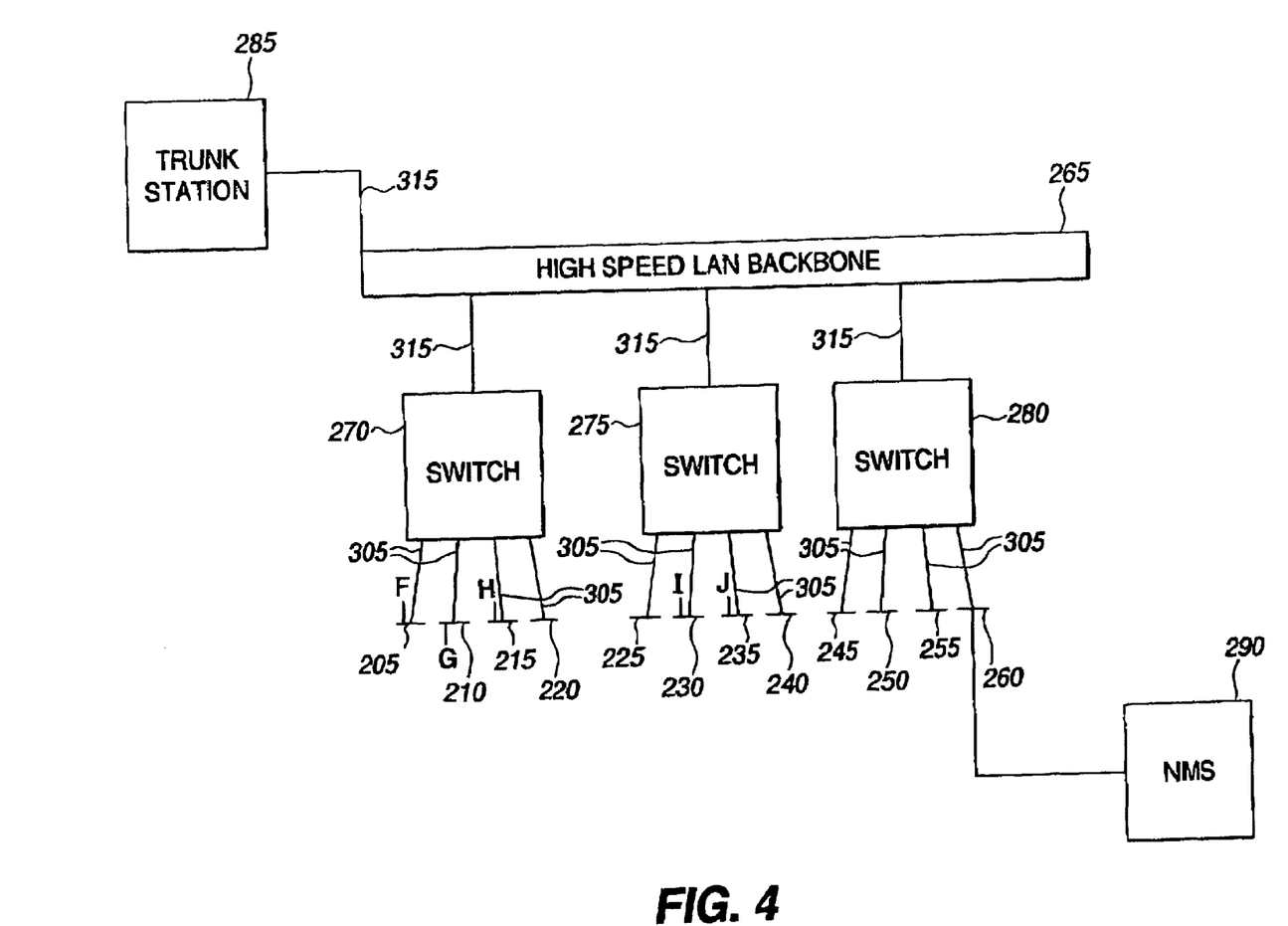
FIG. 4 depicts a schematic diagram of a conventional VLAN system.

Prior art FIG. 4 is a schematic of an exemplary VLAN system. The VLAN system includes LAN's 205–260 which are connected by switches 270–280 to a high-speed LAN backbone or trunk 265. An NMS 290 is interconnected to the switches 270–280 via LAN 260. A trunk station 285 is connected to the high-speed LAN backbone 265 via a trunk port 315. The LAN's 205–215, and 230–235 have designated members F–J. Each of the switches 270–280 is capable of interconnecting the respective LAN's connected to the switch by an access port 305 with each other, e.g. interconnecting LAN's 205–220, and with other LAN's connected by an access port to another of the switches via the high–speed backbone 265, e.g. LAN 205 with LAN's 225–260. For example, switch 270 can be instructed by the NMS 290 to interconnect LAN 205 to LAN 215 by configuring a VLAN including LAN's 205 and 215, thereby facilitating communications between F and H. Switches 270 and 275 can also be instructed by the NMS 290 such that member F of LAN 205 can be interconnected to user I of LAN 230, by configuring a VLAN to include LAN's 205 and 230.

Figure 5:
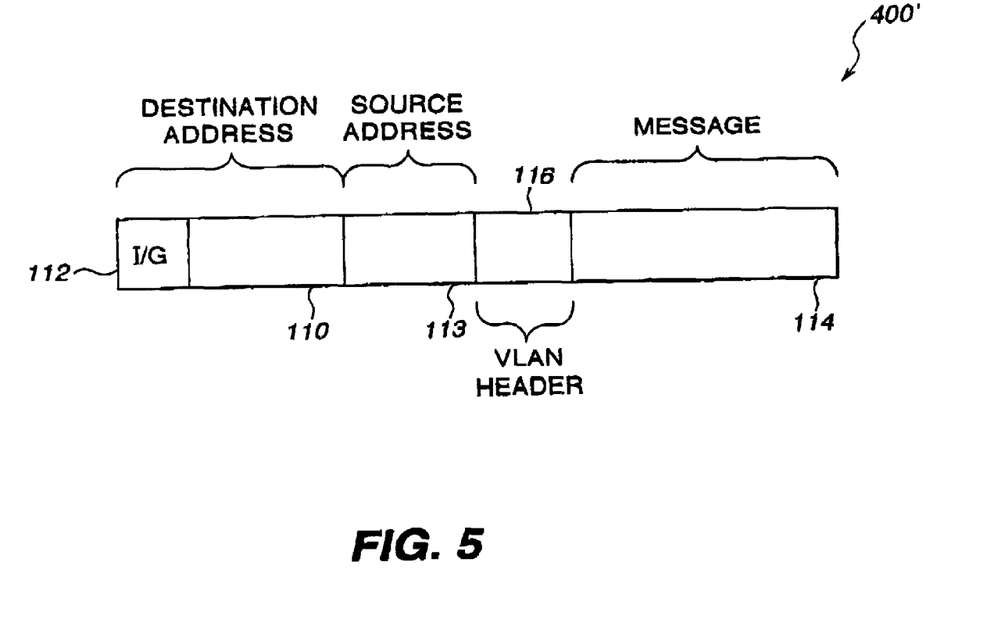
FIG. 5 depicts a conventional VLAN message packet.

Prior art FIG. 5 depicts a VLAN communications packet 400' which is identical to the LAN communications packet 400 depicted in FIG. 3, except that a VLAN header 116 has been added to the packet. The header is appended by the initial switch to which the message packet is directed. The VLAN header identifies the resulting packet as a "VLAN" or "tagged" packet, and represents the particular VLAN from which the packet originated.

For example, if LAN's 205, 220 and 230 of FIG. 4 are within a single VLAN and member F of LAN 205 desires to communicate with member I of LAN 230, the message 114 of FIG. 5 with the MAC address 110 attached is directed to access port 305 of the switch 270. The switch determines, based upon instructions previously received from the NMS 290, that the member I address falls within the applicable VLAN and, accordingly, adds the appropriate VLAN header to the packet to form packet 400', as shown in FIG. 5. The packet 400' is then directed via trunk port 315 to the high-speed backbone LAN 265 and detected by switches 275 and 280.

Since switch 280 lacks any access ports connected to LAN's within the applicable VLAN, switch 280 discards the communication. Switch 275, however, identifies the VLAN header 116 of packet 400' as associated with a VLAN which includes LAN 230. Switch 275 accordingly removes the header and directs the communication, which now appears as message 400 of FIG. 3, to LAN 230 over which the member I receives the message.

Traditional trunk–resident stations, such as trunk station 285, are incapable of recognizing VLAN headers. Further, since no programmable switch is disposed between a trunk station and the trunk, communications with a VLAN header appended thereto will be ignored and/or discarded by the trunk station. Hence, in conventional VLAN systems, such as that shown in FIG. 4, the trunk stations, e.g. trunk station 285, form part of the default group, i.e. the group of system users not within any VLAN. Accordingly, in FIG. 4, any system user on LAN's 205–260 can communicate with the trunk station.

However, it may be advantageous to limit the number of users who are allowed to communicate with a particular trunk station. For example, if the trunk station 285 is a secure server, it may be appropriate to limit access to trunk station 285 to only members of particular LAN's. Accordingly, although conventional VLAN systems have numerous advantages over conventional interconnected bridged LAN systems, a need remains for a VLAN system in which access to trunk stations can be limited to only members of particular LAN's within the system.

SUMMARY OF THE INVENTION

Accordingly, it is an object of the present invention to provide a VLAN system which allows traditional trunk stations, i.e. stations resident on the trunk which are not VLAN-aware, to be configured within a VLAN.

It is also an object of the present invention to provide a VLAN system which facilitates multicast communications to trunk stations configured within a VLAN without causing looping of traffic.

It is another object of the present invention to provide a VLAN system which facilitates both unicast and multicast communications to trunk stations configured within a VLAN.

It is a further object of the present invention to provide a VLAN system in which a trunk station communicates only with members of LAN's within its own VLAN.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

In accordance with the present invention, a switch is provided for use in a virtual communications network having multiple local area networks interconnected by multiple switches. The multiple switches are connected by a trunk which has one or more trunk stations connected directly thereto. The switch, which is preferably a multiported reconfigurable switch, includes a first communications port, often referred to as an access port, connected to a first local area network within a virtual area network, e.g. a virtual local area network (VLAN). The virtual area network includes a second local area network and a trunk station. A second communications port of the switch, often referred to as a trunk port, connects to the trunk. A control console detects unicast and multicast communications from the first local area network.

If the detected communication is a multicast communication, the control console duplicates the communication to form a first communication and a second communication. The console then appends a VLAN header to the first communication for form a VLAN communication. The control console directs transmission of the VLAN communication and the second communication, i.e. the same communication without the VLAN header, to the second communication port of the switch. Accordingly, the communication can be delivered to the. second LAN, based upon recognition of the VLAN communication, and to the trunk station, which will recognize the second communication.

Preferably, if the virtual area network is configured to include a trunk station, even if the communication is to be multicast only to multiple trunk stations or multiple local area networks within the virtual area network, the communication is duplicated, tagged with a VLAN header and directed as described above. However, if desired, only multicast communications addressed to both a trunk station and local area network included in the virtual area network could be duplicated, although this might result in increased processing overhead at the switch.

If the control console detects a unicast communication from the first local area network and identifies the addressee of the message as the trunk station, the unicast communication is transmitted to the second communication port without appending a VLAN header thereto, and without duplicating the message. On the other hand, if the control console detects a unicast communication from the first local area network and identifies the addressee of the message as the second local area network, the unicast communication is transmitted to the second communication port with the VLAN header appended thereto but without duplicating the message.

If the control console detects a unicast communication from the first local area network to a trunk station which is not configured within the virtual area network, the control console will not direct transmission of the unicast communication to the second communication. port, unless the trunk station is a member of the default group.

In accordance with other aspects of the invention, a virtual communications system includes a first switch and a second switch, each connected to the trunk by a trunk port. A trunk station is also connected to the trunk by a trunk port. A first local area network is connected to the first switch and a second local area network is connected to the second switch by access ports. A network manager is connected to the first and the second switches for configuring virtual area networks. If a network is configured to include the first local area network and the trunk station, but to exclude the second local area network, the first switch directs communications from the first local area network to the trunk station based upon the configuration of such a virtual area network by the network manager. The second switch prevents communications from the second local area network to the trunk station based upon the virtual area network configuration. Accordingly, communications from the first local area network to the trunk station are delivered by the system while delivery of communications from the second local area network to the trunk station is prohibited.

DESCRIPTION OF THE PREFERRED EMBODIMENT

Figure 6:
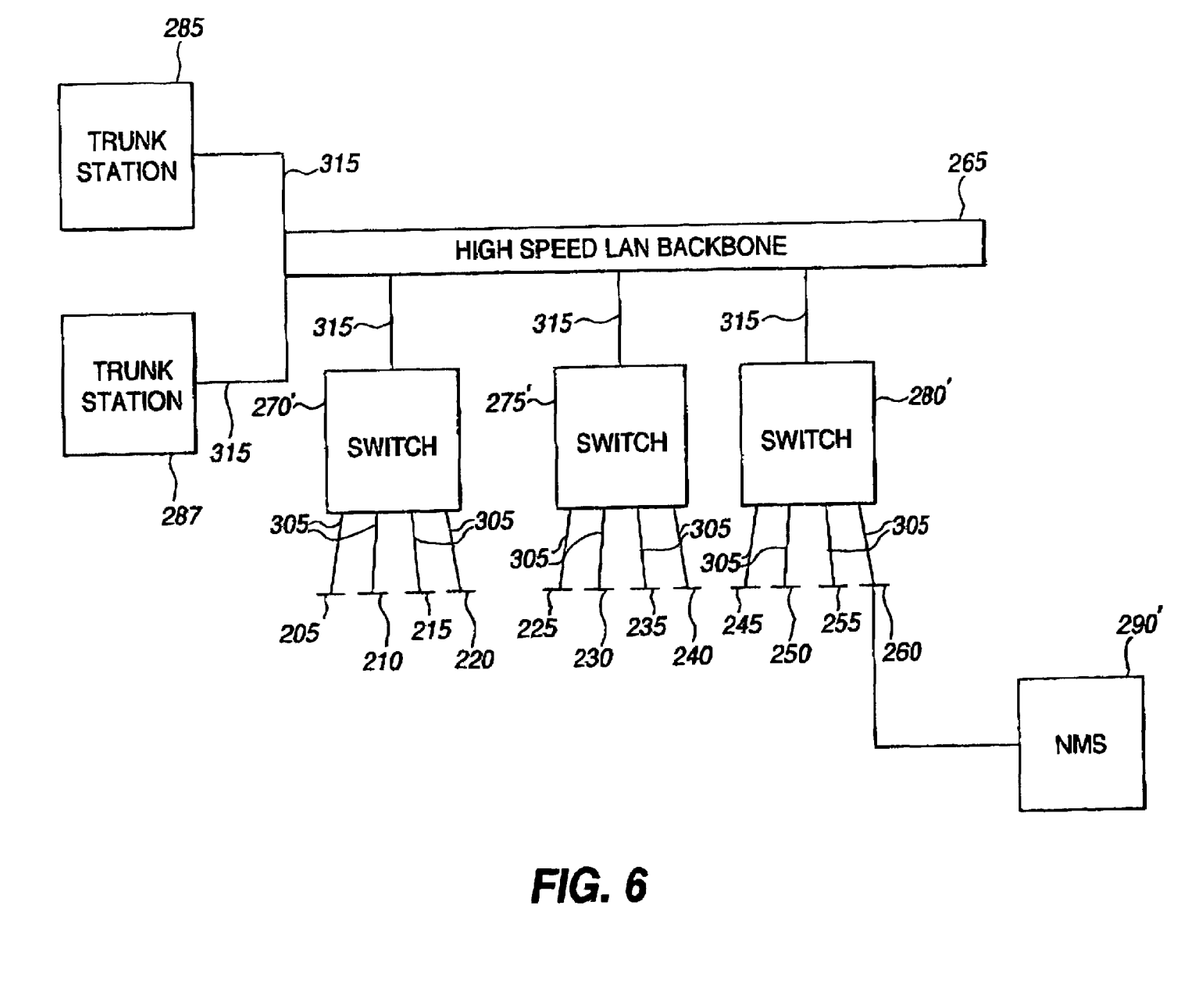
FIG. 6 depicts a schematic diagram of a VLAN system in accordance with the present invention.

FIG. 6 depicts a virtual communications system or network in accordance with the present invention. The network includes multiple local area networks (LAN's) 205–260 interconnected by multiple multiported reconfigurable switches 270', 275' and 280', all of which are connected by a high-speed backbone LAN 265, often referred to as the trunk. Each LAN, other than the backbone LAN 265 is connected to one of the switches 270', 275' or 280' by an access port 305, while the backbone LAN 265 is connected to each switch by a trunk port 315. A network management system (NMS) 290', which may be a workstation having the network management software loaded thereon, manages the network by configuring the network via the switches 270', 275' and 280' to form one or more virtual local area networks (VLAN's). Each of the trunk stations 285 and 287 is connected to the backbone LAN 265 via a trunk port 315. The trunk stations 285 and 287 may, for example, be network servers or other network resources to which some or all of the members of the LAN's 205–260 may require high-speed access from time to time or on a continuous basis as is well understood in the art.

Figure 7:
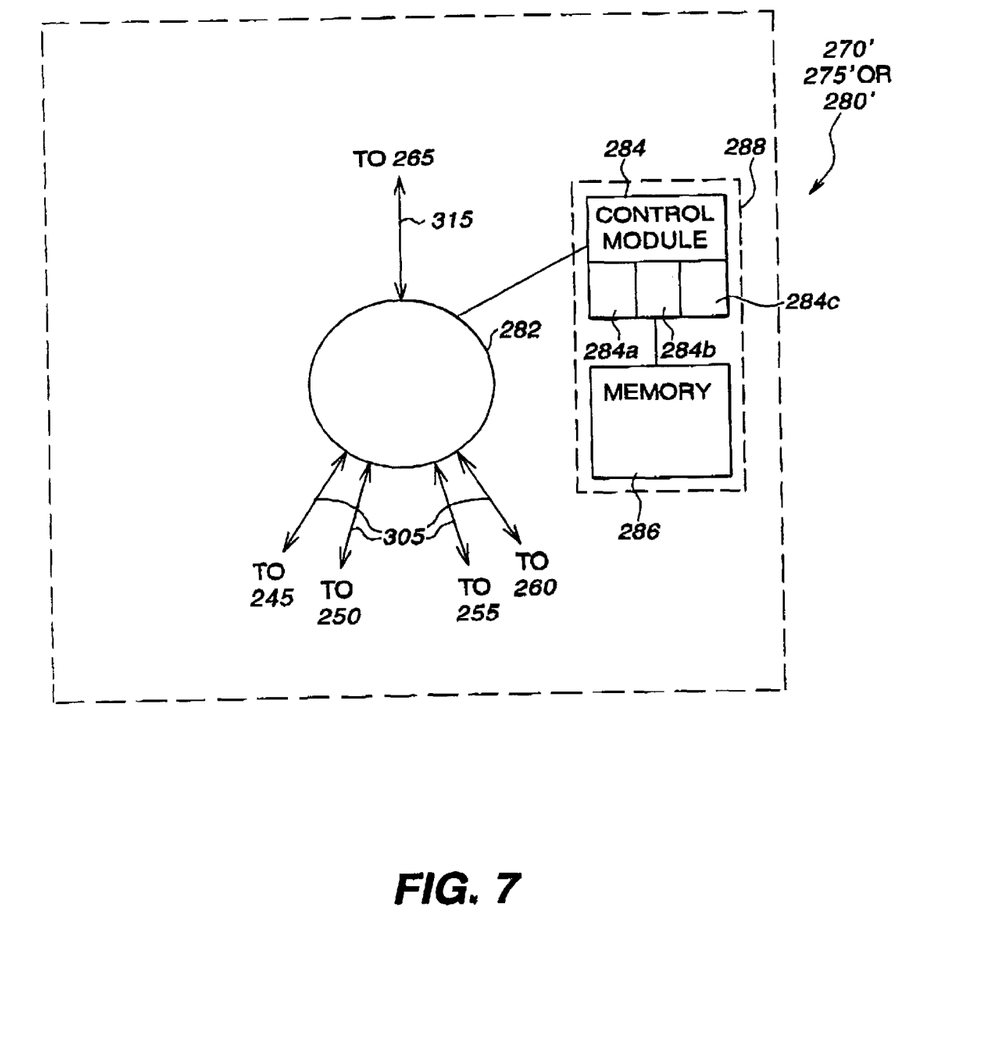
FIG. 7 depicts a switch in accordance with the present invention for use in the FIG. 6 system.

Referring to FIGS. 6 and 7, each of switches 270', 275' and 280' is capable of linking, via the backbone LAN 265, members of each of the LAN's 205–260 to members of the one or more LAN's and the trunk stations within the VLAN's configured by the NMS 290'. In accordance with the present invention, the NMS 290' may configure any or all of these VLAN's to include the trunk stations 285 and 287, as will be further described below.

As shown in FIG. 7, each of the switches 270', 275' and 280' includes a control console 288 having a control module 284 and a memory 286 for storing and processing control and VLAN configuration instructions and data which may be initially programmed into the switch or transmitted to the switch by the NMS 290'. The control module 284 includes a controller 284a for controlling a switching device 282. The detector 284b detects a communication received from the backbone 265 via a trunk port 315 or from a LAN directly connected to the switch via an access port 305. Communications from the backbone 265 may or may not include a VLAN header of the type previously described with reference to FIG. 5. For example, communications from a LAN to a member of the default group will not be tagged, i.e. appended with a VLAN header, by the switch to which the LAN connects via an access port 305. Thus, if one of the ILAN's within the system is in the default group, communications to this LAN from members of other LAN's will not be tagged.

The detector 284b detects all communications over the backbone LAN 265, including, in the case of switches 270' and 275', communications from the NMS 290'. Switch 280' detects communications from the NMS at the access port connected to LAN 260. If the detected communication is deliverable to a network addressee on any of the LAN's connected to an access port of the applicable switch, the controller 284a of the applicable switch controls the switching device 282 to transmit the message from the trunk port 315 to the applicable access port 305. That is, if the detected communication is properly addressed to the addressee and forwarded from an authorized member of the system, e.g. from a member of a VLAN which includes the addressee's LAN or from any other member of the system if the addressee is a member of the default group, the controller 284a of the applicable switch controls the switching device 282 to transmit the message to the applicable LAN.

The control module 284 also includes a tagger 284c for tagging communications received via an access port 305 for transmission from one member to another member of a configured VLAN by appending a VLAN header thereto. The tagger 284c also removes the VLAN header from a communication received from the switch's trunk port 315 which is to be forwarded to a member of a LAN connected to the switch by an access port. More particularly, the tagger 284c discards the tag by removing the VLAN header from the communication, prior to the message being transmitted to the appropriate output port 305, i.e. prior to the controller 284a controlling the switching device 282 to transmit the message from the trunk port 315 to the access port 305.

If the detected communication has been received via an access port 305 of the switch and is properly addressed and deliverable to a network addressee on any of the other LAN's connected to the switch, the controller 284a of the switch controls the switching device 282 to transmit the message from the input access port 305 to the applicable output access port 305. In such case, if the sender and addressee are members of the same VLAN, there is no need to append a VLAN header to the communication before directing it to output port 305. However, if such a communication is to be multicast to one or more LAN's within the applicable VLAN which are directly connected to other switches by access ports, the communication output from the trunk port 315 of the applicable switch will, of course, be tagged by the tagger before transmission via the trunk 265 as discussed above.

Accordingly, all messages between LAN's within configured VLAN's are forwarded to the appropriate addressee LAN. This is accomplished by identifying communications between LAN's within configured VLAN's and tagging the communications, except for those between LAN's connected by an access port to the same switch, with a VLAN header.

Figure 8:
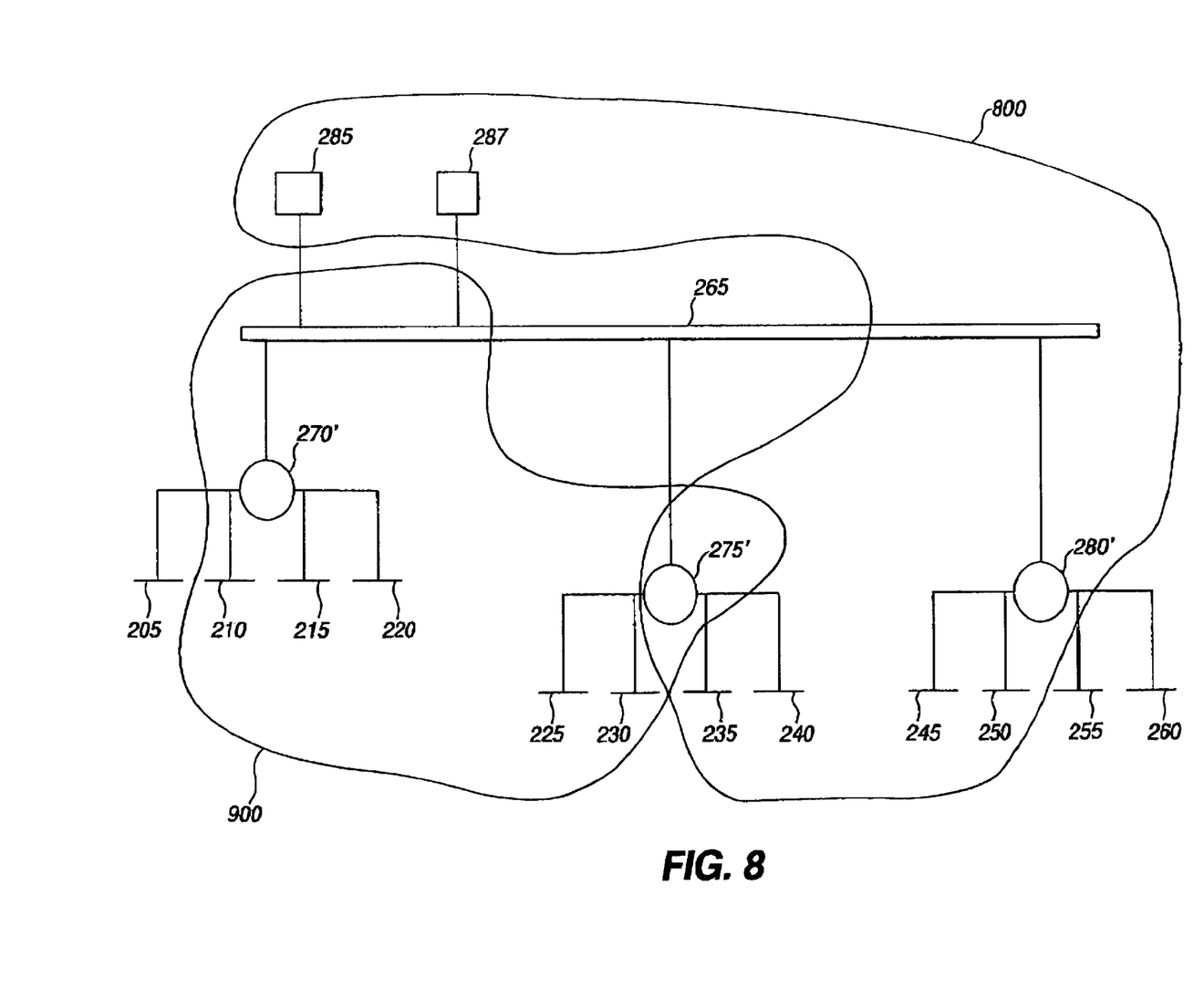
FIG. 8 depicts a VLAN configuration in accordance with the present invention.

Referring now to FIG. 8, the operation of the VLAN system and the switches depicted in FIGS. 6 and 7 will be described. As shown, the NMS 290' has configured the VLAN system into a first VLAN 800 which includes LAN's 235–250 and trunk stations 285 and 287. The NMS 290' has also configured a second VLAN 900 to include LAN's 210–230. Each of the switches has accordingly been instructed and preferably stores information representing each of the VLAN configurations in its memory 286 for use by the control module 284 in detecting, tagging and removing tags from communications received via access ports 305 and trunk port 315, and in controlling the switching device 282. Because the trunk stations 285 and 287 are excluded from the VLAN 900, attempted communications between the trunk stations 285 and 287 and members of LAN's 210–230 which are received by the applicable switch via an access or trunk port are ignored and/or discarded, since the sender and addressee are not within the same VLAN. Further, default group LAN's 205, 255 and 260 are likewise prohibited from communicating with the trunk stations 285 and 287.

Members of each of the LAN's 235–250 are allowed by the applicable switch 275' or 280' to unicast or multicast communications to the trunk stations 285 and 287. For example, if a member of LAN 250 desires to unicast a message to the trunk station 285, the communication received at the access port of the switch 280' will be detected by the detector 284b. The control module 284 determines, utilizing the stored configuration data, that the message is addressed to a trunk station within VLAN 800 and therefore controls, by way of the controller 284a, the switching device 282 to output the communication to the trunk 265 via the trunk port 315. Because the communication has been determined by the control module to be addressed to a trunk station on the sender's VLAN, the communication is output from the trunk port without a VLAN header being appended thereto. Accordingly, the trunk station 285, which is unable to recognize communications encapsulated with a VLAN header, is able to recognize the untagged communication from the LAN 250 and thereby receives the message from the sender.

The switches 270' and 275' in the VLAN system will also receive the communication. However, because the message has been forwarded without a VLAN header, it will be ignored and/or discarded by switch 275' which has access ports connecting only to LAN's within configured VLAN's, i.e. LAN's 225–240. The switches 270' and 280', which have access ports connecting to LAN's within the default group, i.e. LAN's 205, 255 and 260, after determining that the communication is not addressed to any of the members of these LAN's, will likewise ignore any/or discard the communication. The trunk station 287 will also detect the communication and, after determining that the communication is not addressed to it will ignore and/or discard the communication. Hence, since the communication is addressed only to the trunk station 285, except for the transmission by the communication by switch 280' to the trunk 265, the switches and the trunk station 287 will ignore the communication.

If the trunk station 285 unicasts a message to a member of the LAN 250, the communication received at the trunk port 315 of the switch 280' will be detected by the detector 284b. The control module 284 will determine, utilizing the stored configuration data, that the LAN 250 and the trunk station 285 are both configured within VLAN 800, and therefore will control, by way of the controller 284a, the switching device 282 to output the communication to the LAN 250 via the applicable access port 305. Accordingly, the switch 280' is able to recognize the untagged communication from the trunk station 285 and forward the message to the addressee on the LAN 250 in accordance with the instructions previously received from the NMS 290'.

The switches 270' and 275' in the VLAN system will also receive the communication transmitted from trunk station 285. However, because the message has been forwarded without a VLAN header, it will be, ignored and/or discarded by switch 275' which has access ports connecting only to LAN's within configured VLAN's, i.e. LAN's 225–240. The switch 270', which has an access port connecting to a LAN within the default group, i.e. LAN 205, after determining that the communication is not addressed to any of the members of the LAN 205, will likewise ignore and/or discard the communication. The trunk station 287 will also detect the communication and, after determining that the communication is not addressed to it, will ignore and/or discard the communication. Hence, since the communication is addressed only to a member of LAN 250, except for the transmission of the communication by the switch 280' from the trunk port 315 to the applicable access port 305, the switches 270'–280' and the trunk station 287 will ignore the communication after detection.

If a member of LAN 235 desires to multicast a communication to trunk station 287 and a member of LAN 245, the switch 275', which receives the communication via an access port 305, will detect the communication by means of detector 284b. The control module 284 will then determine, based upon configuration data stored in the memory 286, that the multicast communication is addressed to members of VLAN 800. It will also recognize from the configuration data that VLAN 800 includes both trunk stations and other LAN's. Accordingly, the control module 284 will duplicate the communication. One copy of the communication will be tagged by the tagger 284c with a VLAN header, thus encapsulating that copy of the communication so as to form a VLAN communication. The controller 284a will then control the switching device 282 to output both the encapsulated communication and the unencapsulated communication to the backbone 265 via the switch's trunk port 315.

The encapsulated message is received by the switch 280' at the trunk port 315 connected to the backbone 265. The detector 284b of switch 280' detects the VLAN header and recognizes, based upon the configuration data stored in its memory 286, that LAN's 245 and 250 are members of the VLAN 800 Accordingly, the tagger 284c of the switch removes and discards the VLAN header from the communication and the controller 284a controls the switching device 282 such that the communication, with the header now removed, is directed via output access ports 305 to LAN's 245 and 250. The message is discarded by LAN 250 and delivered by LAN 245 to the appropriate addressee in the conventional manner. The unencapsulated message output from the trunk port 315 of the switch 280' is received, via the trunk 265, by the trunk station 285 and thereby delivered to the trunk station. Accordingly, by configuring the trunk stations 285 and 287 within VLAN 800, members of VLAN 800 can unicast or multicast communications to the trunk stations.

If a member of LAN 240 desires to multicast only to LAN's 235, 245 and 250, the switch 275', to which the LAN 240 is connected by an access port 305, detects the message with its detector 284b and, recognizing the message as a multicast communication to members of VLAN 800 which includes trunk stations, will automatically duplicate the communication, tag one copy of the communication and transmit both the encapsulated and unencapsulated copies of the communication to the trunk 265 Via the trunk port 315.

Similarly, should a member of LAN 240 desire to multicast a communication only to trunk stations 285 and 287, the switch 275', to which LAN 240 is connected via an access port 305, duplicates and tags one copy of the communication before outputting both the encapsulated and unencapsulated communications to the trunk 265 via the switch's trunk port 315.

Because the trunk stations 285 and 287 are configured within the VLAN 800, a fire wall is provided between the trunk stations 285 and 287 and the members of LAN's 205–230 and 255–260. As discussed above, if desired, the LAN 800 may be easily reconfigured by the NMS 290' to delete any of the LAN's 235–250 or trunk stations 285 and 287 from the VLAN 800. The system can also be easily reconfigured by the NMS 290' to add any of the LAN's 205–230 and 255–260 to the VLAN 800 to allow other members of the system to communicate with the trunk stations 285 and 287.

As described in detail above, a VLAN system is provided which allows trunk stations to be configured into VLAN's. The system facilitates both secure unicast and multicast communications with trunk stations. In the described VLAN system, trunk stations communicate using unicast and multicast only with members of LAN's which are configured with the trunk station(s) into a VLAN.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

What is claimed is:

1. A switch for use in a virtual communications system having multiple local area networks interconnected by multiple switches that are connected by a trunk having one or more trunk stations connected directly thereto, the switch comprising:

a first communications port to be connected to a first local area network of a virtual area network that includes the first local area network a second local area network and at least one of the trunk stations;

a second communications port to be connected to the trunk; and a control console to detect a multicast communication from the first local area network, to duplicate the multicast communication to form a first communication and a second communication, to append a VLAN header to the first communication to form a VLAN communication, and to direct transmission of the VLAN communication and the second communication to the second communications port.

2. The switch according to claim 1, wherein:
the multicast communication is addressed to at least one member of the second local area network; and
addressees of the multicast communication do not include any trunk stations included in the virtual area network.

3. The switch according to claim 1, wherein:
the multicast communication is addressed to at least one of the trunk stations included in the virtual area network; and
addressees of the multicast communication do not include members of any local area networks included in the virtual area network.

4. The switch according to claim 1, wherein the control console is further operative to detect a unicast communication from the first local area network, to identify the addressee of the unicast message as one of the trunk stations included in the virtual area network, and to direct transmission of the unicast communication, without appending a VLAN header thereto, to the second communications port.

5. A switch according to claim 1, wherein:
the switch is a multiported reconfigurable switch;
the first communications port is an access port;
the second communications port is a first trunk port; and
each of the one or more trunk stations is connected to the trunk by a distinct trunk port.

6. A method of communicating messages in a virtual area network having multiple local area networks interconnected by multiple switches that are connected by a trunk having one or more trunk stations connected directly thereto, the method comprising:
detecting a multicast communication from a first local area network of a virtual area network that includes the first local area network, a second local area network and at least one of the trunk stations;
duplicating the multicast communication to form a first communication and a second communication;
appending a VLAN header to the first communication to form a VLAN communication; and
directing transmission of the VLAN communication and the second communication to the trunk.

7. The method of communicating messages in a virtual area network according to claim 6, wherein:
the multicast communication is addressed to at least one member of the second local area network; and
addressees of the multicast communication do not include any trunk stations included in the virtual area network.

8. The method of communicating messages in a virtual area network according to claim 6, wherein:
the multicast communication is addressed to at least one of the trunk stations included in the virtual area network; and
addressees of the multicast communication do not include members of any local area network included in the virtual area network.

9. The method of communicating messages in a virtual area network according to claim 6, further comprising:
detecting a unicast communication from the first local area network;
identifying the addressee of the unicast message as one of the trunk stations included in the virtual area network; and directing transmission of the unicast communication, without appending a VLAN header thereto, to the trunks.

10. A switch for use in a virtual communications system having multiple local area networks interconnected by multiple switches which are connected by a trunk having one or more trunk stations connected directly thereto, the switch comprising:
a first communications port to be connected to a first local area network of a virtual area network that includes the first local area network, at least one of the trunk stations and one or more other local area networks;
a second communications port to be connected to the trunk; and
a control console to detect a unicast communication from the first local area network, to append a VLAN header to the unicast communication in the event that the unicast communication is addressed to one of the other local area networks of the virtual area network, to refrain from appending a VLAN header in the event that the unicast communication is addressed to one of the trunk stations of the virtual area network, and to direct transmission of the unicast communication to the second communications port and on to the trunk.

11. The switch according to claim 10, wherein:
the switch is a multiported reconfigurable switch;
the first communications port is an access port;
the second communications port is a first trunk port; and
each of the trunk stations is connected to the trunk by a distinct trunk port.

12. A method of communicating messages in a virtual area network having multiple local area networks interconnected by multiple switches which are connected by a trunk having one or more trunk stations connected directly thereto, the method comprising:
detecting a unicast communication from the first local area network of a virtual area network that includes the first local area network, at least one of the trunk stations and one or more other local area networks;
appending a VLAN header to the unicast communication if the unicast communication is addressed to one of the other local area networks included within the virtual local area network;
refraining from appending a VLAN header to the unicast communication if the unicast communication is addressed to one of the trunk stations included within the virtual local area network; and
directing transmission of the unicast communication on to the trunk.

13. The switch according to claim 1, wherein the multicast communication is addressed to at least the second local area network and at least one of the trunk stations of the virtual area network.

14. The method according to claim 6, wherein the multicast communication is addressed to at least the second local area network and at least and one of the trunk stations of the virtual area network.

15. The switch according to claim 10, wherein the control console is further operative to determine whether the unicast communication is addressed to one of the trunk stations included within the virtual area network or one of the other local area networks included within the virtual area network.

16. The method according to claim 12, wherein the method further comprises:
determining whether the unicast communication is addressed to one of the trunk stations included within the virtual area network or one of the other local area networks included within the virtual area network.

17. A system for communicating messages in a virtual area network having multiple local area networks interconnected by multiple switches that are connected by a trunk having one or more trunk stations connected directly thereto, the system comprising:

means for detecting a multicast communication from a first local area network of a virtual area network that includes the first local area network, a second local area network and at least one of the trunk stations;

means for duplicating the multicast communication to form a first communication and a second communication;

means for appending a VLAN header to the first communication to form a VLAN communication; and means for directing transmission of the VLAN communication and the second communication to the trunk.

18. The system according to claim 17, wherein:

the multicast communication is addressed to at least one member of the second local area network; and addressees of the multicast communication do not include any of the trunk stations included in the virtual area network.

19. The system according to claim 17, wherein:

the multicast communication is addressed to at least one of the trunk stations included in the virtual area network; and addressees of the multicast communication do not include members of any local area networks included in the virtual area network.

20. The system according to claim 17, further comprising:

means for detecting a unicast communication from the first local area network;

mean for identifying the addressee of the unicast message as one of the trunk stations of the virtual area network; and means for directing transmission of the unicast communication, without appending a VLAN header thereto, to the trunk.

21. The system according to claim 17, wherein the multicast communication is addressed to at least the second local area network and at least one of the trunk stations of the virtual area network.

22. A system for communicating messages in a virtual area network having multiple local area networks interconnected by multiple switches which are connected by a trunk having one or more trunk stations connected directly thereto, the system comprising:

means for de detecting a unicast communication from the first local area network of a virtual area network that includes the first local area network, at least one of the trunk stations and one or more other local area networks;

means for appending a VLAN header to the unicast communication in the event that the unicast communication is addressed to one of the other local area networks included within the virtual local area network;

means for refraining from appending a VLAN header to the unicast communication in the event that the unicast communication is addressed to one of the trunk stations included within the virtual local area network; and means for directing transmission of the unicast communication on to the trunk.

23. The system according to claim 22, wherein the system further comprises:

means for determining whether the unicast communication is addressed to one of the trunk stations included within the virtual area network or one of the other local area networks included within the virtual area network.

24. The switch according to claim 1, wherein the control console is further operative to direct transmission of the second communication to the second communications port without a VLAN header appended thereto.

25. The switch according to claim 6, wherein the transmission of the second communication is directed to the trunk without a VLAN header appended thereto.

26. The system according to claim 17 wherein the means for directing transmission is operative to direct transmission of the second communication is transmitted to the trunk without appending a VLAN header thereto.

* * * * *

UNITED STATES PATENT AND TRADEMARK OFFICE
CERTIFICATE OF CORRECTION

PATENT NO.     : 6,469,987 B1
DATED          : October 22, 2002
INVENTOR(S)    : Anil P. Rijhsinghani It is certified that error appears in the above-identified patent and that said Letters Patent is hereby corrected as shown below:

Column 10,
Line 60, please add -- , -- after the first occurrence of the word "network";

Column 11,
Line 59, please replace "network" with -- networks --;

Column 12,
Line 3, please replace "trunks" with -- trunk --; and

Column 14,
Line 9, please delete the word "de".

Signed and Sealed this

Third Day of June, 2003

JAMES E. ROGAN
*Director of the United States Patent and Trademark Office*